(12) United States Patent
Shortes et al.

(10) Patent No.: US 11,051,542 B2
(45) Date of Patent: Jul. 6, 2021

(54) CLEANING APPARATUS USING REACTIVE OXIDIZERS

(71) Applicant: Anderson Remplex, Inc., Flower Mound, TX (US)

(72) Inventors: Samuel Shortes, Lewisville, TX (US); Neal Cooper, North Richland Hills, TX (US); Justin Pendleton, The Colony, TX (US)

( * ) Notice: Subject to any disclaimer, the term of this patent is extended or adjusted under 35 U.S.C. 154(b) by 0 days.

(21) Appl. No.: 16/369,616

(22) Filed: Mar. 29, 2019

(65) Prior Publication Data

US 2020/0305492 A1 Oct. 1, 2020

(51) Int. Cl.
| | | |
|---|---|---|
| *A23N 12/02* | (2006.01) | |
| *A23L 5/00* | (2016.01) | |
| *A23L 5/20* | (2016.01) | |
| *B08B 3/02* | (2006.01) | |
| *B08B 3/08* | (2006.01) | |
| *B08B 3/10* | (2006.01) | |

(52) U.S. Cl.
CPC ............ *A23N 12/02* (2013.01); *A23L 5/276* (2016.08); *A23L 5/57* (2016.08); *B08B 3/02* (2013.01); *B08B 3/08* (2013.01); *B08B 3/102* (2013.01); *A23V 2002/00* (2013.01); *G05B 2219/35044* (2013.01); *G05B 2219/45244* (2013.01)

(58) Field of Classification Search
CPC ........... A23N 12/02; A23L 5/276; A23L 5/57; B08B 3/02; B08B 3/08; B08B 3/102; A23V 2002/00; G05B 2219/35044; G05B 2219/45244
See application file for complete search history.

(56) References Cited

U.S. PATENT DOCUMENTS

| | | | | |
|---|---|---|---|---|
| 5,246,025 A | * | 9/1993 | Cawlfield | ............... B08B 3/102 134/102.2 |
| 2009/0266383 A1 | * | 10/2009 | Wang | ........................ A23L 5/57 134/25.3 |
| 2019/0374912 A1 | * | 12/2019 | Nakao | ...................... B01F 11/02 |

FOREIGN PATENT DOCUMENTS

| | | | |
|---|---|---|---|
| CN | 205624351 U | * | 10/2016 |
| CN | 206852827 U | * | 1/2018 |

OTHER PUBLICATIONS

CN206852827U machine translation (Year: 2018).*
CN205624351U machine translation (Year: 2016).*
CN205624351U Abstract (Year: 2016).*

* cited by examiner

*Primary Examiner* — Douglas Lee
(74) *Attorney, Agent, or Firm* — Stephen Y. Liu; Carstens & Cahoon, LLP (57) ABSTRACT

An apparatus for washing a set of objects. The apparatus includes a washing chamber and a ROX generator fluidically connected to the washing chamber via a fluid conduit having a distal end that terminates at the washing chamber. The ROX generator is configured to provide reactive oxidizers to a carrier liquid to form a cleaning liquid with ROX cleaning bubbles, wherein the cleaning liquid is transported through the fluid conduit and into the washing chamber.

12 Claims, 9 Drawing Sheets

CLEANING APPARATUS USING REACTIVE OXIDIZERS

BACKGROUND

Technical Field

Novel aspects of the present disclosure relate to an improved apparatus and a corresponding method of use for cleaning a set of objects arranged therein. More particularly, the present disclosure is directed to a novel sanitation apparatus configured to generate reactive oxidizers to form an improved cleaning liquid for neutralizing pathogens and removing chemical residues and other contaminants the outer surface of the set of objects.

Background

Food-borne illnesses are caused by pathogens. Proper preparation neutralizes pathogens; for example, milk is often pasteurized, and meat is cooked to a minimum internal temperature. However, produce is commonly consumed raw or only partially cooked. Simple washing can remove some surface contaminants, but cannot effectively neutralize pathogens or remove chemical residues, such as pesticides, in an efficient manner. Accordingly, an improved sanitation apparatus is needed for reducing and/or eliminating the dangers associated with uncooked or undercooked foods.

SUMMARY OF THE INVENTION

Novel aspects of the present invention are directed to an improved cleaning liquid formed from a cleaning liquid having reactive oxidizer (ROX) cleaning bubbles and a novel apparatus for cleaning a set of objects using the cleaning liquid. In one embodiment, novel aspects herein relate to an apparatus that includes a washing chamber and a ROX generator fluidically connected to the washing chamber via a fluid conduit having a distal end that terminates at the washing chamber. The ROX generator is configured to provide reactive oxidizers to a carrier liquid to form a cleaning liquid with ROX cleaning bubbles, wherein the cleaning liquid is transported through the fluid conduit and into the washing chamber to wash the set of objects arranged therein.

In another embodiment, novel aspects herein relate to a method for cleaning a set of objects, the method including the steps of arranging the set of objects in a washing chamber; charging a carrier liquid with ROX cleaning bubbles to form a cleaning liquid; and introducing the cleaning liquid into the washing chamber to clean a surface of the set of objects.

Other aspects, embodiments and features of the invention will become apparent from the following detailed description of the invention when considered in conjunction with the accompanying figures. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention.

BRIEF DESCRIPTION OF THE FIGURES

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying figures, wherein:

DETAILED DESCRIPTION

Foods that are consumed raw or only partially cooked are often washed to remove contaminants and microorganisms that can cause food poisoning. One common method of cleaning fresh produce is soap and water. However, the method is time-consuming, particularly if the produce is washed individually. The soap can remove some surface contaminants but cannot neutralize illness-causing pathogens. Also, the soapy water that remains after washing is generally unsuitable for re-use and is frequently discarded down the drain. Another common method of cleaning fresh produce is with a vinegar bath that involves soaking the fresh produce in a solution of water and vinegar. The vinegar bath can be effective at neutralizing some pathogens. After the vinegar bath, the fresh product must undergo a subsequent rinsing step to remove the residual vinegar. This method utilizes larger quantities of water, and because the vinegar cannot be effectively recovered, the diluted vinegar solution is often discarded down the drain. In both methods, inadequate rinsing can leave traces of soap or vinegar that can impart an undesirable taste.

Accordingly, novel aspects of the illustrative embodiments disclosed herein recognize a need for creating an improved sanitation apparatus and corresponding method of use for effectively and efficiently cleaning and disinfecting a set of objects, such as fruits and vegetables. The sanitation apparatus utilizes reactive oxidizer cleaning bubbles added to a carrier liquid to form a cleaning liquid that obviates the need for surfactants or antimicrobial additives that can negatively affect the taste of the fresh produce. The cleaning liquid is a highly effective antimicrobial capable of eliminating illness-causing pathogens. In addition, the reactive oxidizer cleaning bubbles eventually decompose, converting the cleaning liquid back into the carrier liquid for possible reuse in subsequent washing cycles or reapplication for other purposes. For example, in the embodiment where the carrier liquid is water, decomposition of the reactive oxidizers reverts the cleaning liquid back into water, which can then be used to water household plants or filtered for consumption.

Reactive oxidizers, which will also be referred to herein as ROX, neutralize pathogens and remove pesticides without the use of chemicals or detergents. In a carrier liquid, such as water, the ROX apply a large oxidative stress on simple lifeforms such as fungi and bacteria, which neutralizes the most common pathogens that contaminate fresh produce. Higher lifeforms have the ability to defend against oxidative stress. ROX can include reactive oxygen species (ROS) and reactive nitrogen species (RNS), both of which naturally decompose to form oxygen, hydrogen, nitrogen, and water so that a cleaning liquid can revert back to a carrier liquid. In some embodiments, ROX is limited only to reactive oxygen species, such as ozone. In other embodiments, ROX is mostly, if not substantially formed from reactive oxygen species with only a small or trace mount of reactive nitrogen species. For example, ROX can include between 95-99% or more reactive oxygen species with the remainder formed from reactive nitrogen species. The presence of high amounts of reactive nitrogen species can form nitric/nitrous acid in some embodiments, which can have undesirably long half-lives and which can also have a detectable taste in high enough concentrations.

ROX can be formed using conventional techniques and equipment, including cold plasma, corona discharge, and electrolysis. However, for the ROX to be effective as an antimicrobial for cleaning and disinfecting, the ROX should be incorporated into a carrier liquid as ROX cleaning bubbles to form a cleaning liquid. In one embodiment, the ROX cleaning bubbles are microbubbles. In another embodiment, the ROX cleaning bubbles are nanobubbles. In yet another embodiment, the ROX cleaning bubbles are a combination of microbubbles and nanobubbles. ROX microbubbles, and in particular ROX nanobubbles, have a tendency to remain in solution, e.g., can be suspended in a carrier liquid or even sink, which effect prevents the ROX from diffusing out of the carrier liquid and into the air. By converting gaseous ROX into ROX cleaning bubbles, the higher concentration of ROX in a carrier liquid is preserved, which effect makes the cleaning liquid more effective.

On average, the ROX microbubbles have a diameter greater than 1 micrometer, and more specifically a diameter between 10-30 micrometers, and in a particular embodiment ROX microbubbles have an average diameter between 15-25 micrometers. ROX nanobubbles have a diameter that is less than 1000 nanometers, and more specifically ROX nanobubbles have diameters that are less than 700 nanometers. In a particular embodiment, the ROX nanobubbles have diameters that are 100 nanometers or less.

The half-life of ROX can vary based on a number of different criteria, including the type of carrier (i.e., liquid versus air), temperature, pH, and presence of decomposition inhibitors. In a non-limiting embodiment, the cleaning liquid formed from water serving as a carrier liquid charged with ROX cleaning bubbles, the half-life of the ROX is approximately between 30-40 minutes at room temperature and a neutral pH, which is sufficient for washing and disinfecting produce. Increasing temperature reduces the half-life of ROX in water, and inclusion of decomposition inhibitors, such as carbonate ions, can prolong the half-life of ROX in water.

Figure 1:
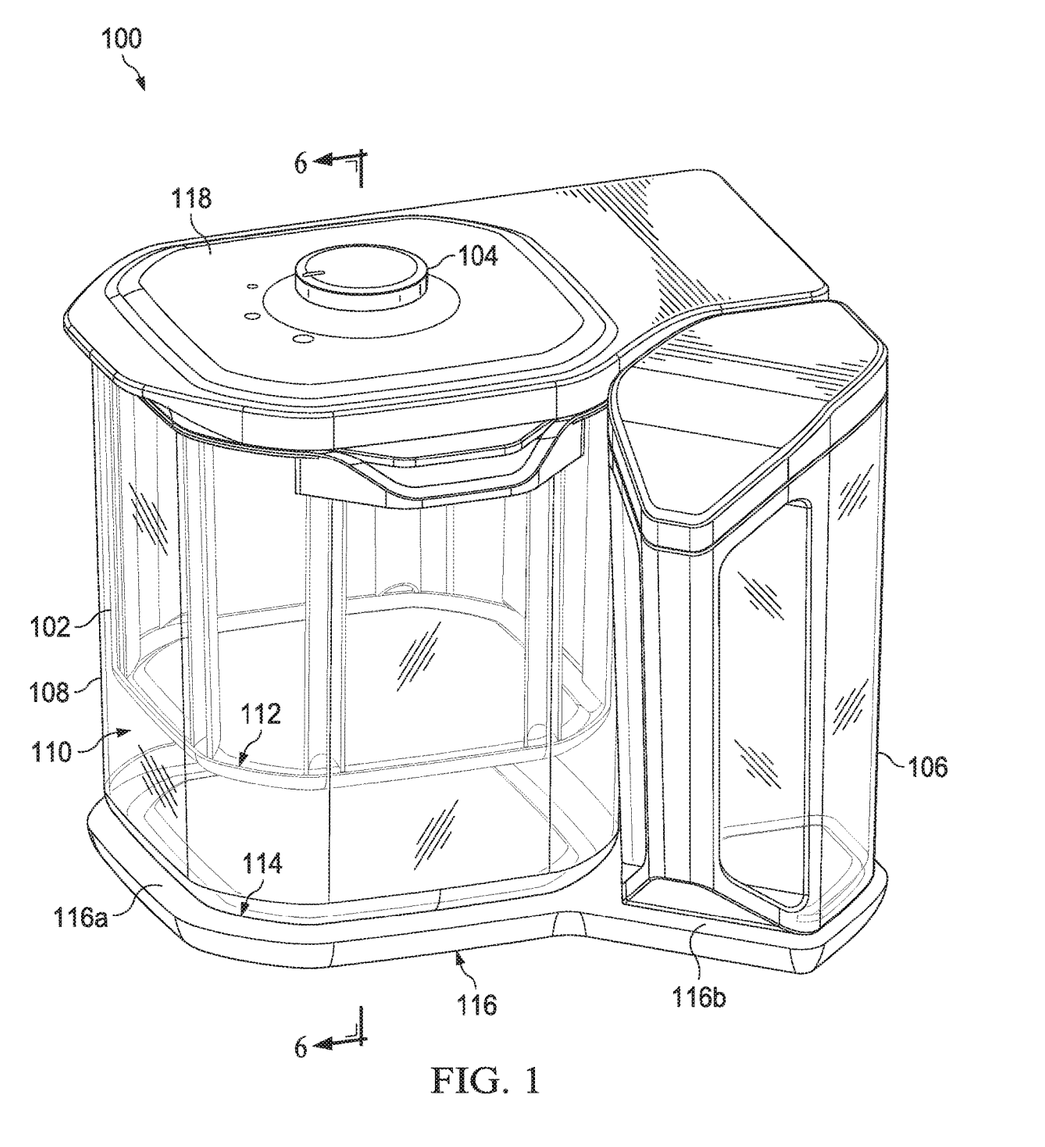
FIG. 1 is a perspective view of a sanitation apparatus in the fully-assembled configuration according to an illustrative embodiment.

FIG. 1 is a perspective view of a sanitation apparatus in the fully-assembled configuration according to an illustrative embodiment. The sanitation apparatus 100 is designed to clean and disinfect a set of objects with a cleaning liquid that includes reactive oxidizers. More specifically, the set of objects is arranged within a washing chamber 102 of the sanitation apparatus 100 and after a washing cycle is selected by manipulating input device 104, cleaning liquid is prepared in reservoir 106 and then pumped to the washing chamber 102 for cleaning and disinfecting the set of objects disposed therein. As used herein, the term "set" means one or more. Accordingly, a set of objects that are washed in the sanitation apparatus 100 can be one object, or two or more objects. In addition, while the set of objects can be fresh, uncooked (or only partially cooked), previously cooked, and/or unprocessed comestibles, such as produce, the sanitation apparatus 100 also can accommodate any number of inedible items including kitchenware, toys, and the like.

In the various exemplary embodiments discussed herein, the cleaning liquid is formed from water serving as a carrier liquid, which is then charged with ROX. However, the carrier liquid can include non-toxic additives, such as pH modifiers and decomposition inhibitors to prolong the half-life of the reactive oxidizers.

In this illustrative embodiment in FIG. 1, the washing chamber 102 is suspended within a collection chamber 108 to leave a volume of space 110 between the end wall 112 of the washing chamber 102 and the end wall 114 of the collection chamber 108 unoccupied. The volume of space 110 collects the used cleaning liquid as the set of objects are being rinsed, allowing the surface contaminants to accumulate in the collection chamber 108 to prevent the set of objects from being submerged in the used cleaning liquid and risk inadvertent re-contamination by sediment and chemical residues.

The exemplary sanitation apparatus 100 includes a base 116 having a first platform 116a sized to receive the collection chamber 108 and a second platform 116b sized to receive the reservoir 106. In addition, the sanitation apparatus 100 includes a lid 118 that is rotatable to facilitate the placement of the collection chamber 108 onto the first platform 116a when in the raised position, and to secure the collection chamber 108 onto the first platform 116a when in the lowered position. Securing the collection chamber 108 during the washing cycle can prevent inadvertent removal that would result in uncontrolled discharge of cleaning liquid from the plurality of nozzles disposed throughout the underside of the lid 118. In some embodiments the lid 118 may include a locking mechanism that physically prevents removal of the collection chamber 108 until the washing cycle is complete.

After washing is complete, the collection chamber 108 can be removed from the first platform 116a, allowing the washing chamber 102 to be extracted from the collection chamber 108 so that the used cleaning liquid can be discarded down the drain or used for other purposes, such as watering household plants, after the used cleaning fluid has decomposed back into the carrier liquid. In another embodiment, which is discussed in more detail in FIGS. 2 and 7, the collection chamber 108 can be fluidically connected to the reservoir 106 when the collection chamber 108 is seated on the first platform 116a and the reservoir 106 is seated on the second platform 116b so that the used cleaning liquid can be passed through a filtration unit before sending back to the reservoir 106 for reuse.

Figure 2:
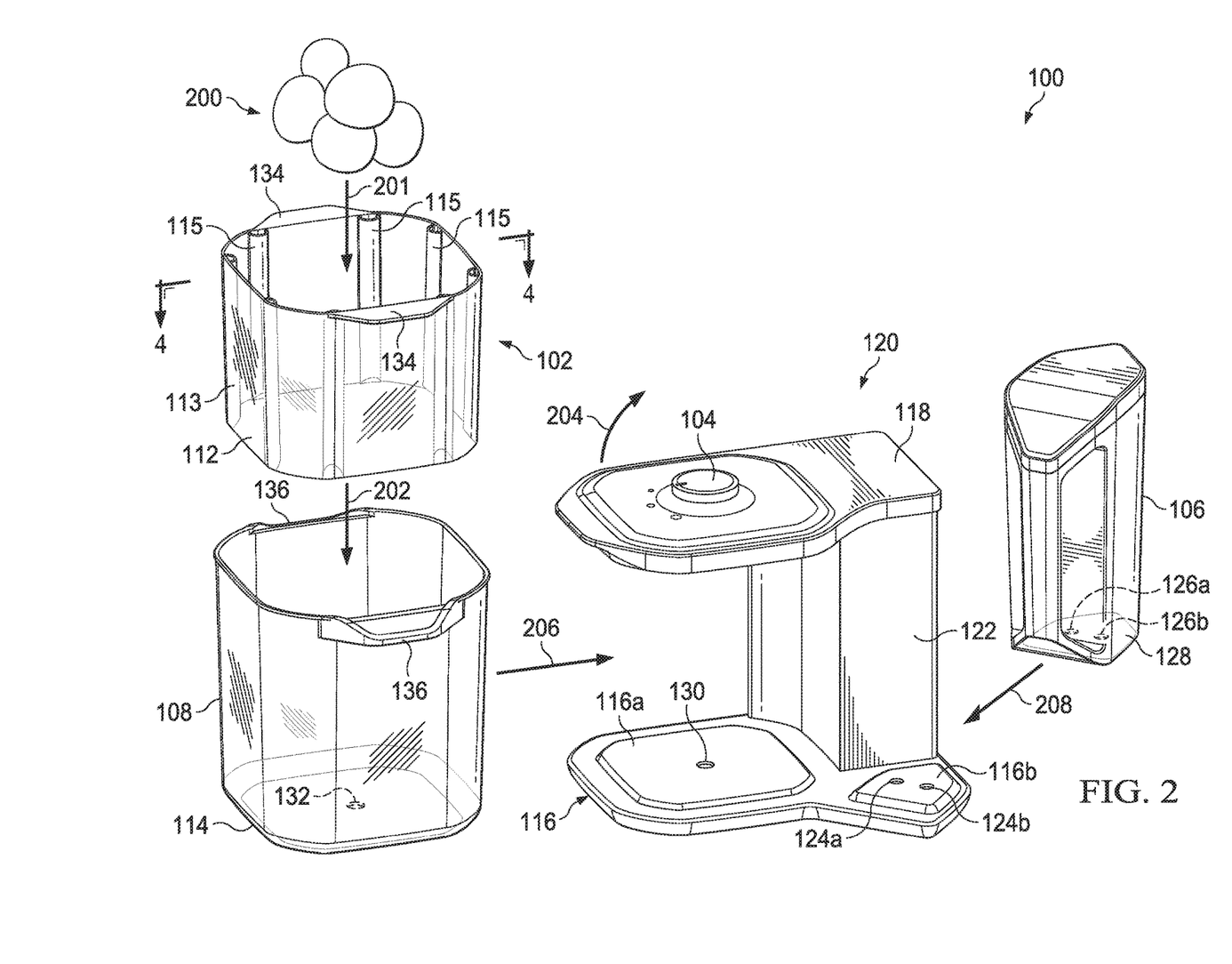
FIG. 2 is the sanitation apparatus in a partially disassembled configuration according to an illustrative embodiment.

FIG. 2 is the sanitation apparatus in a partially disassembled configuration according to an illustrative embodiment. The sanitation apparatus 100 includes a support frame 120 formed generally of a body 122 defining a cavity for housing fluid conduits and equipment (not shown), such as pumping equipment, filtration equipment, and a ROX generator. The body 122 is supported by the base 116 and topped by the lid 118 that is rotatable in the direction of arrow 204.

The washing chamber 102 has an opening separated from an end wall 112 by a sidewall 113. Disposed about the interior surface of the sidewall 113 is a set of channels 115. The set of channels 115 has a proximate end at the open end of the washing chamber 102 and extend at least partially down the sidewall 113 towards the end wall 112 with a distal end directed toward a stream redirection feature (shown in more detail in FIGS. 4, 5 and 6). Cleaning liquid introduced into the set of channels 115 can be directed through washing chamber 102 and then sprayed onto surfaces of the set of objects 200 that would be otherwise unreachable by overhead nozzles.

The second platform 116b includes a first opening 124a and a second opening 124b. When the reservoir 106 is seated on the second platform 116b, the first opening 124a aligns with an inlet orifice 126a formed into the end wall 128 of the reservoir 106, and the second opening 124b aligns with an outlet orifice 126b formed into the end wall 128. In one embodiment, the inlet orifice 126a and the outlet orifice 126b are selectively sealed by a pair of spring-loaded valves (not shown) so that liquid can be maintained within the reservoir 106 when removed from the second platform 116b, while allowing fluids to move into and out of the reservoir 106 when seated on the second platform 116b.

In the illustrative embodiment in FIG. 2, reactive oxidizer cleaning bubbles generated by a ROX generator housed within the body 122 of the sanitation apparatus 100 can be introduced into the reservoir 106 through the first opening 124a and the corresponding inlet orifice 126a to transform the carrier liquid stored in the reservoir 106 into a cleaning liquid. Thereafter, the cleaning liquid can be extracted from the reservoir 106 via the outlet orifice 126b and the second opening 124b and sent to the washing chamber 102. Thus, the reservoir 106 is fluidically connected to the washing chamber 102 by a fluid conduit housed within the support frame 120, which has a proximate end beginning at the second opening 124b and a distal end terminating at a set of nozzles (not shown) configured to inject the cleaning liquid into the washing chamber 102.

In the embodiment where the collection chamber 108 is fluidically connected to the reservoir 106 to allow the used cleaning liquid to be reused, the first platform 116a includes a drain 130 at one end of a fluid conduit that terminates at an opening in the second platform 116b to allow liquid to enter the reservoir 106. In one non-limiting embodiment, used cleaning fluid from the collection chamber 108 can enter reservoir 106 via opening 124b, outfitted with a Y-shaped coupling with an adjustable valve. The position of the adjustable valve determines whether a liquid is pumped into or out of the reservoir 106.

When the collection chamber 108 is seated on the first platform 116a, the drain 130 is aligned with an aperture 132 that passes through the end wall 114 of the collection chamber 108 to provide a means of egress for the used cleaning liquid. A pump housed within the body 122 of the support frame 120 can pump the used cleaning liquid from the collection chamber 108 to the reservoir 106.

Reassembly of the sanitation apparatus 100 in preparation for washing a set of objects 200 can be accomplished by placing the set of objects 200 into the washing chamber 102 in the direction of arrow 201. The washing chamber 102 can be suspended in the collection chamber 108 by aligning the set of flanges 134 projecting outwardly from the sidewall of the washing chamber 102 with the set of handles 136 projecting outwardly from the sidewall of the collection chamber 108 and then inserting the washing chamber 102 into the collection chamber 108 in the direction of arrow 202. The collection chamber 108 can then be seated on the first platform 116a in the direction of arrow 206, making certain that the aperture 132 in the end wall 114 of the collection chamber 108 is aligned with the drain 130 if the sanitation apparatus 100 is configured to return the used cleaning liquid to the reservoir 106 for reuse. Thereafter, the lid 118 can be rotated in a direction opposite to arrow 204 to achieve a closed configuration to secure the collection chamber 108 onto the first platform 116a to prevent inadvertent removal. Before or after seating the collection chamber 108 on the first platform 116a, the reservoir 106 can be filled at a sink or other location then returned to the sanitation apparatus 100 and seated onto the second platform 116b in the direction of arrow 208. In some instances, the reservoir 106 can be filled while still seated on the second platform 116b. For example, the sanitation apparatus 100 may be located proximate to a faucet with an extendable neck that can be extended towards the reservoir 106 for filling. The openings 124a and 124b in the second platform 116b are aligned with inlet 126a and outlet 126b, respectively, to fluidically connect the reservoir 106 with the washing chamber 102 and optionally the collection chamber 108. A washing cycle can be selected by manipulating the input device 104 to the proper setting.

The effectiveness of the cleaning liquid generated by the sanitation apparatus 100 is primarily a function of ROX concentration in the cleaning liquid and exposure time of pathogens to the cleaning liquid. Accordingly, in a non-limiting embodiment, manipulating the input device 104 allows a user to select between one of a plurality of preset washing cycles, each of which can differ based on duration of washing cycle, ROX concentration, force of spraying of cleaning liquid, or combinations thereof. ROX concentration can be controlled by controlling the operating time of a ROX generator, which dictates how long a carrier liquid is being charged with ROX cleaning bubbles. For example, a shorter operating time is associated with a lower ROX concentration whereas a longer operating time is associated with a higher ROX concentration. ROX concentration may also be increased by including a dehumidifier or other form of drying device capable of removing moisture from air, which increases ozone production. In addition, washing cycles may also differ based on temperature, pH, and/or washing methods.

One type of washing method is simply a rinse using cleaning liquid sprayed onto the set of objects from the downwardly and/or upwardly direction(s). Another type of washing method can include a bath of cleaning liquid that can be implemented independently, either before or after spraying with cleaning liquid.

In some embodiments, the input device 104 can allow a user to identify a type of fruit or vegetable so that the sanitation apparatus 100 can automatically identify an appropriate washing cycle based on commonly encountered contaminants and pathogens. In another embodiment, the sanitation apparatus 100 may include a wireless communications module (not shown) housed with the body 122 which can communicate with a server to identify outbreaks of foodborne illnesses and recommend to a user one of the preset washing cycles or create a customized washing cycle to effectively neutralize the offending microorganisms.

Figure 3:
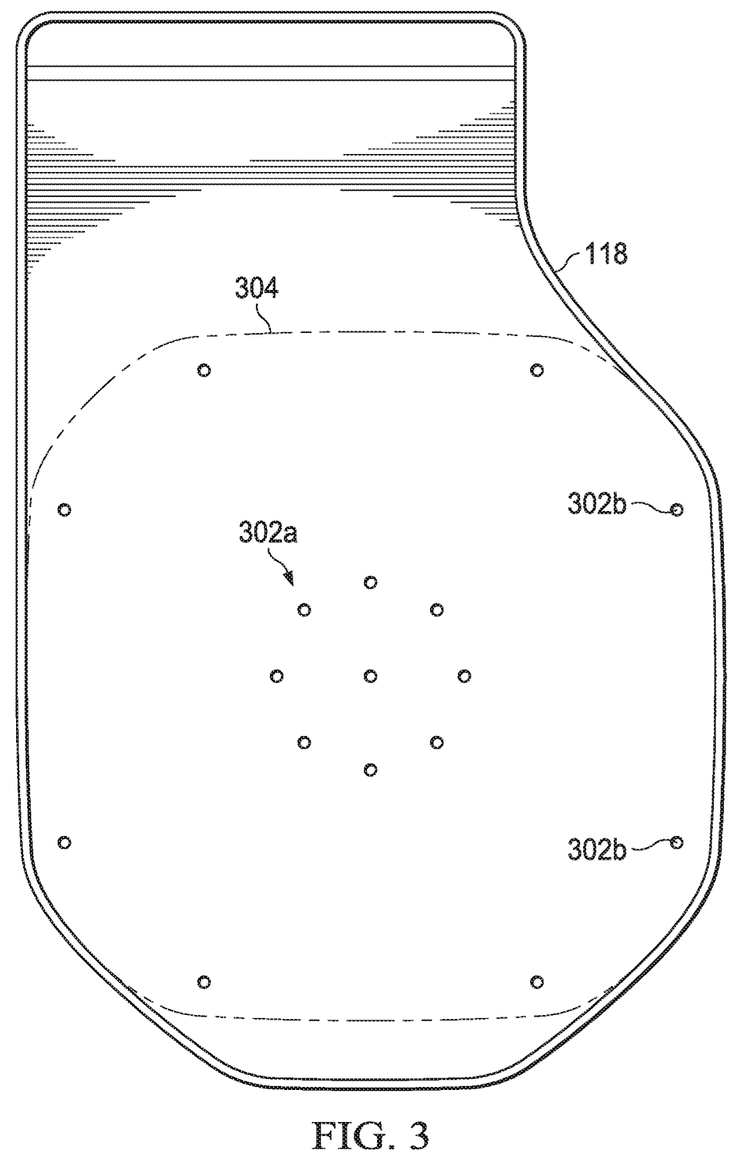
FIG. 3 depicts the placement of nozzles disposed throughout the underside of the rotatable lid in accordance with an illustrative embodiment.

FIG. 3 depicts the placement of nozzles disposed throughout the underside of the rotatable lid in accordance with an illustrative embodiment. The plurality of nozzles 302 is configured to spray a cleaning liquid into the washing chamber 102 to simultaneously engage the upper and lower surfaces of a set of objects arranged therein, as can be seen in more detail in FIG. 6 below.

The plurality of nozzles 302 includes a first set of nozzles 302a arranged centrally on the underside of the rotatable lid 118 to project a cleaning liquid downwardly onto a set of objects 200 in the washing chamber 102. For clarity, downwardly is a direction that includes the gravitational vector. The plurality of nozzles 302 includes a second set of nozzles 302b arranged along a perimeter 304 that coincides with the upper rim of the washing chamber 102 formed by the sidewall 113. The second set of nozzles 302b is configured to inject a cleaning liquid through the plurality of channels disposed along the interior surface of the sidewall 113 of the washing chamber 102, which can be used to rinse surfaces of the set of objects 200 that would be inaccessible to overhead nozzles. Cleaning liquid introduced into the washing chamber 102 through the second set of nozzles 302b are sprayed onto the set objects 200 in the upwardly direction. Upwardly describes a direction that includes a directional vector opposite to the gravitational vector.

The plurality of nozzles 302 can be fixed nozzles. However, in alternate embodiments, the nozzles can be adjustable to control not only the direction of spray but also characteristics of the spray, such as strength of the spray.

Figure 4:
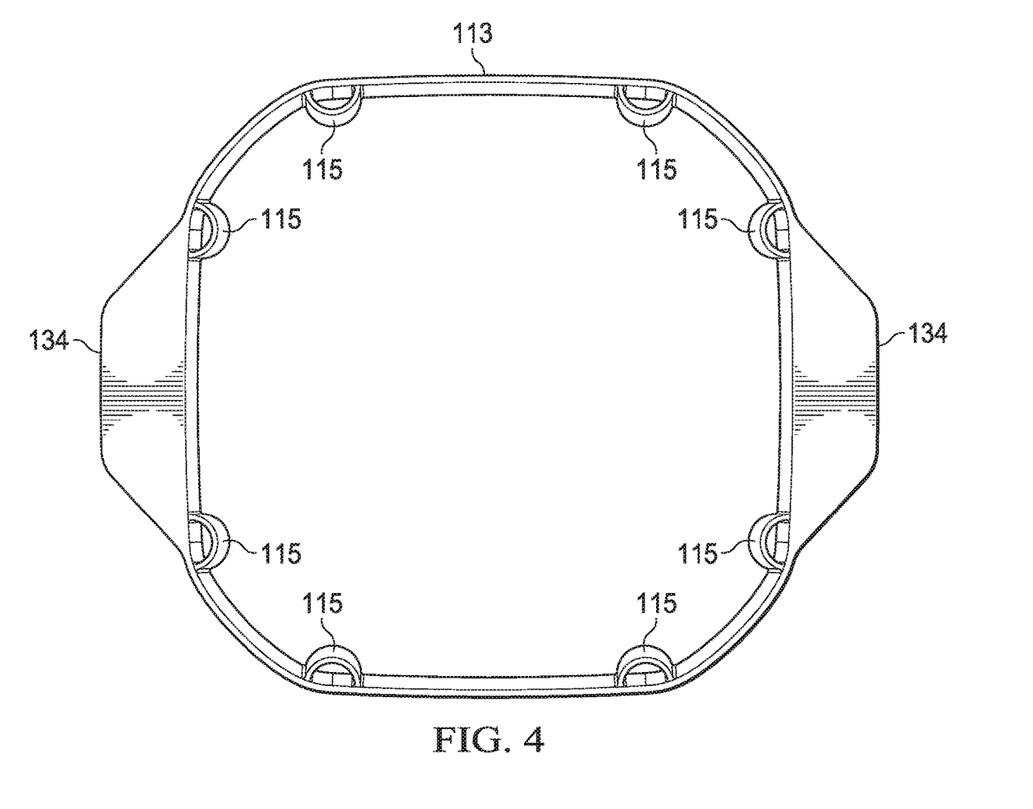
FIG. 4 shows a cross-sectional view of a washing chamber taken along lines 4-4 in FIG. 2 according to an illustrative embodiment.

FIG. 4 shows a cross-sectional view of the washing chamber 102 in accordance with an illustrative embodiment. The cross-sectional view is taken along line 4-4 in FIG. 2 and depicts a set of flanges 134 projecting outwardly from the sidewall 113 of the washing chamber 102 as well as the cross-section of each of the set of channels 115 arranged along the interior surface of the washing chamber 102. Each of the set of channels 115 is aligned with one nozzle in the set of nozzles 302b disposed along the perimeter 304 of the underside of the lid 118. The set of channels 115 helps to maintain sufficient pressure and/or control to allow the cleaning liquid introduced into the washing chamber 102 through the set of nozzles 302b to effectively engage the underside of the set of objects 200 within the washing chamber 102. In another embodiment, where the set of nozzles 302b can provide sufficient pressure and velocity of cleaning liquid entering the washing chamber 102, the set of channels 115 may be omitted so that cleaning liquid can be injected downwardly into the washing chamber 102 and substantially parallel to the sidewall 113 of the washing chamber 102 to engage one or more stream redirection features.

Figure 5A:
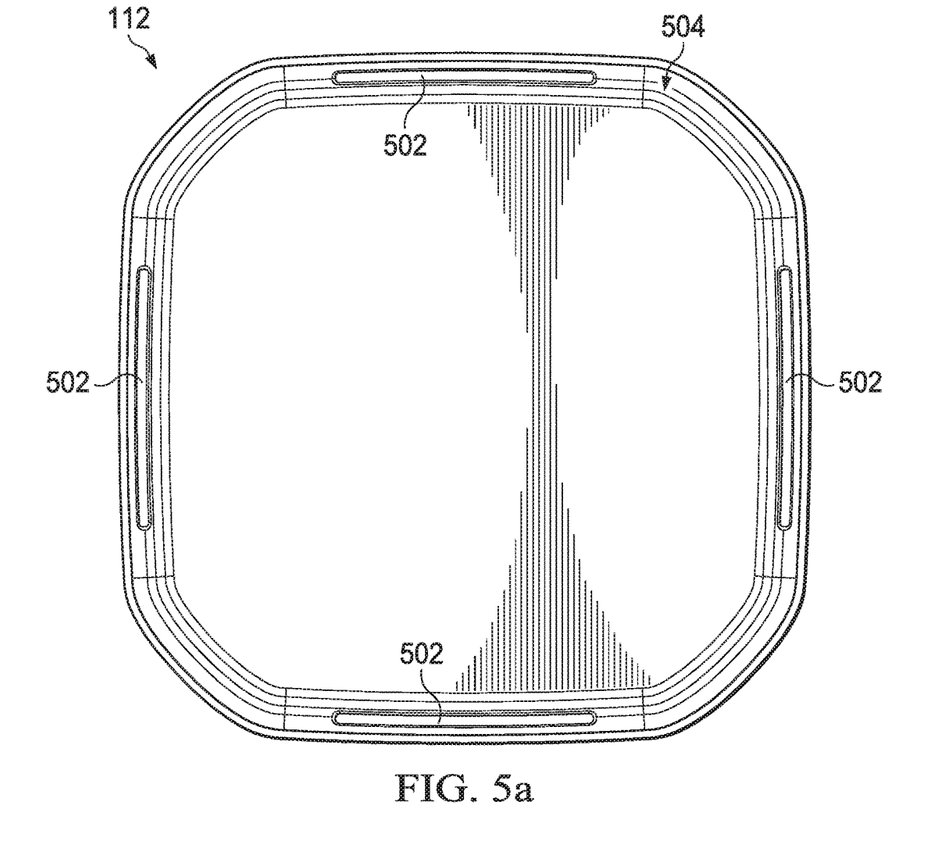
FIGS. 5a and 5b depict various views of the end wall of a washing chamber in accordance with an illustrative embodiment.
Figure 5B:
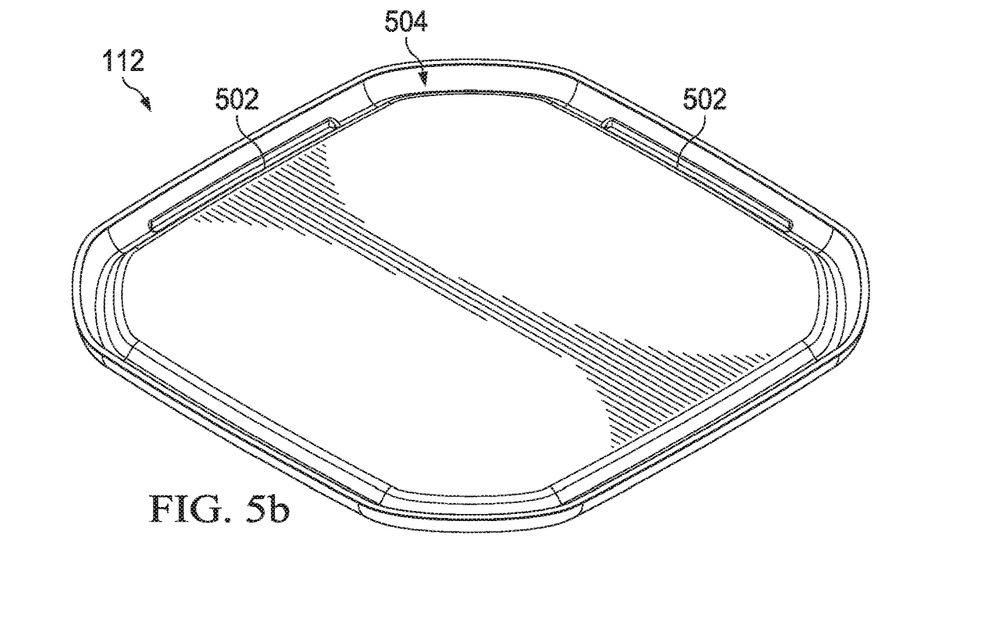

FIGS. 5a and 5b depict various views of the end wall 112 of a washing chamber 102 in accordance with an illustrative embodiment. Arranged around the perimeter of the end wall 112 is a set of draining conduits 502, which are depicted as elongated apertures that allow liquid to drain from the washing chamber 102 into the collection chamber 108.

In this illustrative embodiment in FIG. 5, the set of draining conduits 502 are located within a recessed channel 504 that is coextensive with the outer perimeter of the end wall 112. The channel 504 serves as the stream redirection feature that redirects a cleaning liquid flowing through the set of channels 115 to allow a cleaning liquid to be projected at least partially upward.

Although not depicted, in another embodiment the set of draining conduits 502 can be selectively obstructed to allow a cleaning liquid to collect in the washing chamber 102 for a portion of the washing cycle to allow the set of objects 200 to become at least partially immersed in a bath of cleaning liquid. In this embodiment, the obstructions can be removed to allow the cleaning liquid to drain from the washing chamber 102, then cleaning liquid can be sprayed into the washing chamber 102 from the plurality of nozzles 302 while the draining conduits 502 are unobstructed so that used cleaning liquid can be drained from the washing chamber 102 during the spraying step. The set of draining conduits 502 can be obstructed using any conventionally available means, such as a sliding or rotating gate. In another embodiment, the washing chamber 102 can rest at the bottom of the collection chamber 108 so that contact between the two end walls 112 and 114 obstruct the set of draining conduits 502 to allow cleaning liquid to gather within the washing chamber 102. Thereafter, the washing chamber 102 can be separated from the collection chamber 108 to allow the used cleaning liquid to be draining from the washing chamber 102, then rinsed by the cleaning liquid sprayed from the plurality of nozzles 302.

Figure 6:
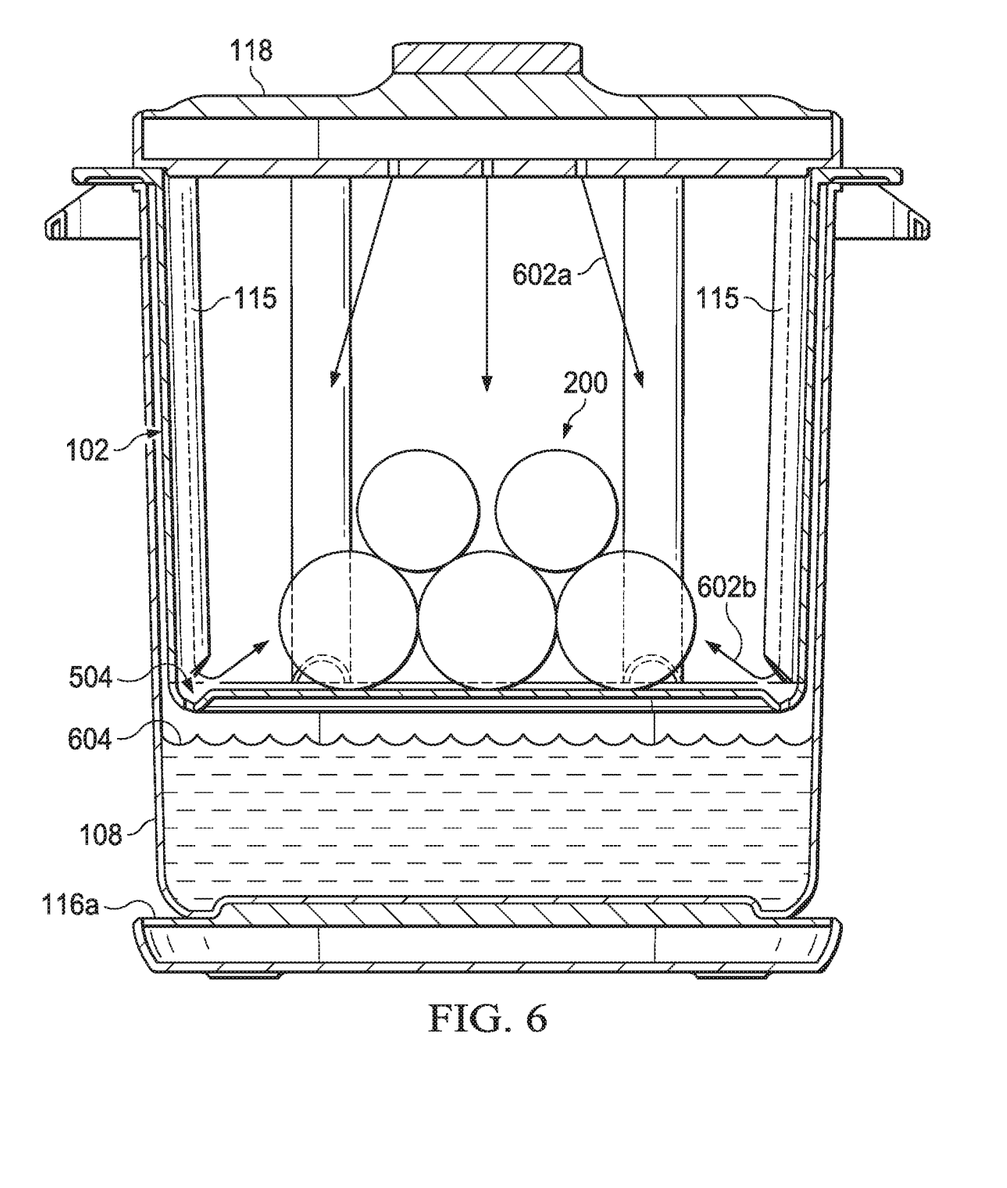
FIG. 6 is a cross section of the sanitation apparatus taken along line 6-6 in FIG. 1 according to an illustrative embodiment.

FIG. 6 is a cross section of the sanitation apparatus taken along line 6-6 in FIG. 1 according to an illustrative embodiment. A set of objects 200 is arranged within the washing chamber 102, which is suspended within the collection chamber 108. Collection chamber 108 is seated on the first platform 116a and secured thereon by locking lid 118. A cleaning liquid can be pumped from a reservoir 106 to the washing chamber 102, which can then be sprayed onto the set of objects 200 within the washing chamber 102. As can be seen, the set of nozzles 302a directs a cleaning liquid in the downward direction in the direction of arrows 602a while the set of nozzles 302b directs cleaning liquid downwardly through the set of channels 115. The cleaning liquid flowing through the set of channels 115 is then redirected by a set of stream redirection features 504 to spray the underside of the set of objects 200 in the upwardly direction shown by arrows 602b. Used cleaning liquid 604 can drain from the washing chamber 102 into the collection chamber 108. As already discussed, the used cleaning liquid 604 can be dumped out of the collection chamber 108 after the collection chamber 108 is removed from the first platform 116a, or in another embodiment the used cleaning liquid 604 can be filtered and returned to the reservoir 106 via a drain 130 in the first platform 116a.

Figure 7:
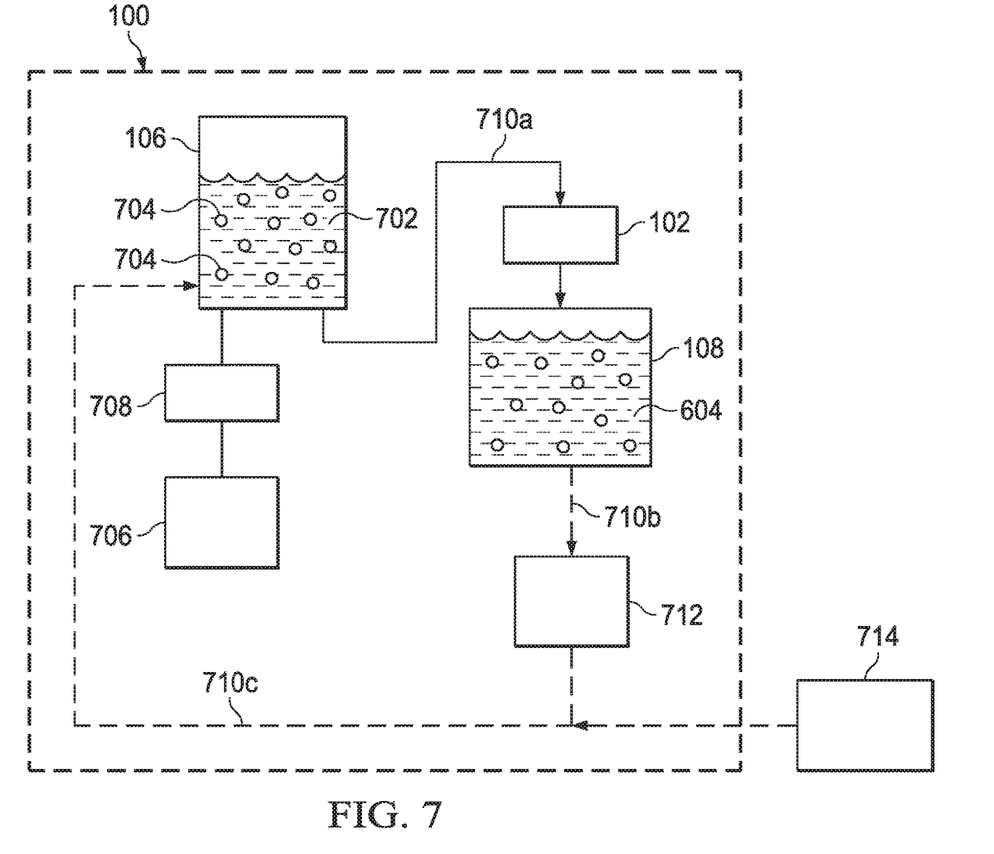
FIG. 7 is a schematic diagram of the components in a sanitation apparatus in accordance with an illustrative embodiment.

FIG. 7 is a schematic diagram of the components in a sanitation apparatus in accordance with an illustrative embodiment. Reservoir 106 is depicted with a volume of cleaning liquid 702 maintained therein. The cleaning liquid 702 includes a plurality of suspended ROX cleaning bubbles 704.

The reactive oxidizers are generated by a reactive oxidizer generator 706, hereinafter referred to as a ROX generator 706. In one embodiment, the ROX generator 706 forms reactive oxidizers using conventional equipment and techniques that include cold plasma, corona discharge, and electrolysis. The reactive oxidizers generated by the ROX generator 706 are often in gaseous form and take the form of bubbles in a carrier liquid, such as water. However, due to the size of the reactive oxidizer bubbles formed by conventional equipment and techniques, the reactive oxidizers often diffuse out of the liquid phase and decompose in air. The reduced concentration of reactive oxidizers in the carrier liquid reduces the effectiveness of the cleaning liquid 702. Accordingly, a bubbler 708 interfaces between the ROX generator 706 and the carrier liquid so that the carrier liquid can be charged with ROX cleaning bubbles 704. In a nonlimiting example, the bubbler 708 is fluidically connected to the ROX generator 706 via a first opening 124a in the second platform 116b and the aperture selectively sealed by spring-loaded valve 126a in the end wall 128 of the reservoir 106.

The bubbler 708 can take the form of any conventionally available bubbler including a porous air stone that can generate microbubbles from the gaseous ROX generated by the ROX generator 706. In one embodiment, the air stone is fixed to the end wall 128 of the reservoir 106 so that the air stone contacts the carrier liquid when the reservoir 106 is at least partially filled. In this manner ROX microbubbles generated by the air stone can diffuse into the carrier liquid to form a cleaning liquid. In another embodiment, the air stone is housed within the base 116 or integrated with the ROX generator 706 but maintained in fluid contact with the carrier liquid when the reservoir 106 is seated on the second platform 116b to allow the ROX microbubbles to diffuse into the liquid phase. In yet another specific embodiment, the bubbler 708 is mechanical shear bubbler, cavitation-based bubbler, or other form of nanobubbler housed within the body 122 of the sanitation apparatus 100 and interfacing between the ROX generator 708 and the reservoir 106 to convert gaseous ROX into nanobubbles.

The reservoir 106 is also fluidically connected to washing chamber 102. In a nonlimiting embodiment, the cleaning liquid 702 is transported through a fluid conduit 710a for injection into the washing chamber 102. Although not depicted, at the downstream end of the fluid conduit 710a can terminate at a set of nozzles to allow the cleaning liquid 702 to be sprayed into the washing chamber 102. During the washing cycle or sometime thereafter, the used cleaning liquid 604, which may include ROX microbubbles as well as contaminants originating from the outer surface of the set of objects, is collected in collection chamber 108.

In one embodiment, the reservoir 106 can be removed from the sanitation apparatus 100 and filled with a carrier liquid. Where the carrier liquid is tap water, the reservoir 106 can be filled at a kitchen sink. In this embodiment or another, after the washing cycle has been completed, the collection chamber 108 can be manually emptied. Alternatively, the used cleaning liquid 604 can be sent to a filtration unit 712 via fluid conduit 710b and then returned to the reservoir 106 via fluid conduit 710c for reuse. The liquid returning to the reservoir 106 can be supplemented by an "on-demand" source of carrier liquid 714, separate and apart from the sanitation apparatus 100. In one embodiment, the on-demand source of carrier liquid 714 is a water line connected to a municipal water supply.

Figure 8:
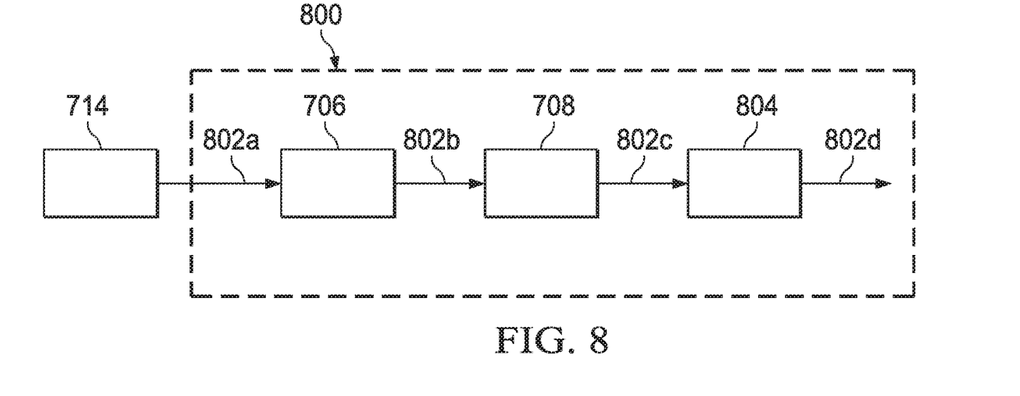
FIG. 8 is a schematic diagram of a sanitation apparatus in accordance with an alternate illustrative embodiment.

FIG. 8 is a schematic diagram of a sanitation apparatus in accordance with an alternate illustrative embodiment. Sanitation apparatus 800 can be implemented as an industrial apparatus capable of accommodating higher volumetric flow-rates than the sanitation apparatus 100 depicted in FIGS. 1 and 2, which is preferably sized to fit on the countertop of residential kitchens. The increased volumetric flow-rate is achieved by obviating the reservoir 106 implemented in the sanitation apparatus 100 in FIG. 7.

The sanitation apparatus 800 includes a ROX generator 706 configured to receive a carrier fluid via fluid conduit 802a. In one embodiment, the fluid conduit 802a is a water line connected to an on-demand source of carrier fluid, such as a municipal water supply. The ROX generator 706 is connected to a bubbler 708 by fluid conduit 802b. Carrier fluid and reactive oxidizers generated by the ROX generator 706 is transmitted through the fluid conduit 802b to the bubbler 708, which is configured to transform the reactive oxidizers into reactive oxidizer cleaning bubbles to form a cleaning liquid. The cleaning liquid is conveyed through fluid conduit 802c to the washing chamber 804 for use in cleaning and disinfecting a set of objects arranged therein. Used cleaning liquid can be discharged from the washing chamber 804 via fluid conduit 802d, which can be connected to a municipal sewage system in a non-limiting embodiment.

In one embodiment, a set of objects is arranged within the washing chamber 804 and rinsed with cleaning liquid. For example, sanitation apparatus 800 can implemented in a restaurant for cleaning and disinfecting large amounts of fresh, raw produce. Although not depicted, the washing chamber 804 can include an agitator that continually reorients each of the set of objects arranged within the washing chamber 804 during the washing cycle.

In another embodiment, although not depicted, the washing chamber 804 can include a series of discrete washing stations populated by conventionally available equipment. For example, in a first washing station, a set of objects can be conveyed through a water bath formed from the cleaning liquid generated by the ROX generator 706. Rotating paddles can be used to convey the set of objects through the water bath if the set of objects is buoyant, otherwise a submerged conveyor belt can be used. Takeout conveyors can be used to transfer the set of objects from the water bath to a second washing station. In the second washing station, the set of objects can be rinsed with the cleaning liquid in a rotating drum or along the length of another conveyor belt that transfers the set of objects to a final preparation station, such as a food processing or packaging station (not shown). The examples described herein should not be deemed illustrative and non-limiting.

Figure 9:
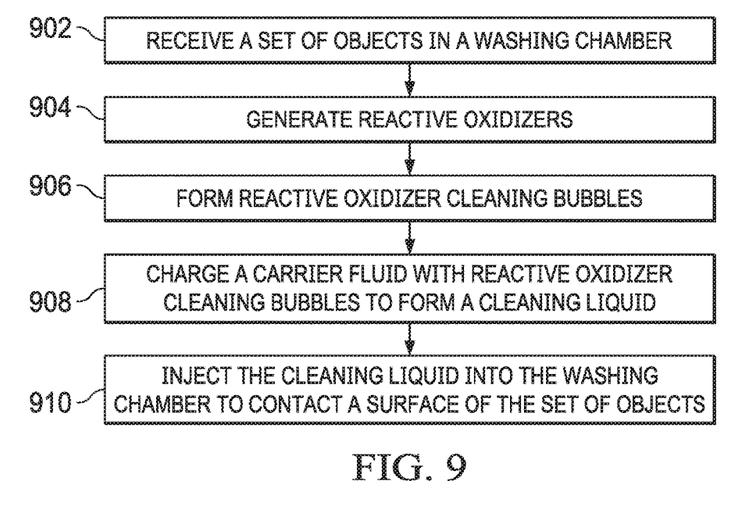
FIG. 9 a method of cleaning a set of objects in accordance with an illustrative embodiment.

FIG. 9 a method of cleaning a set of objects in accordance with an illustrative embodiment. The method can be performed by a sanitation apparatus, such as sanitation apparatus 100 depicted in FIGS. 1 and 2.

A set of objects is received by a washing chamber (Step 902). Reactive oxidizers are generated (Step 904). The reactive oxidizers can be generated using conventional equipment and techniques that include cold plasma, corona discharge, and electrolysis. The reactive oxidizers are passed through a bubbler in contact with the carrier fluid to form reactive oxidizer cleaning bubbles (Step 906). A carrier liquid is then charged with the reactive oxidizer cleaning bubbles to form a cleaning liquid (Step 908). The cleaning liquid is then injected into the washing chamber to rinse the set of objects (Step 910).

Figure 10:
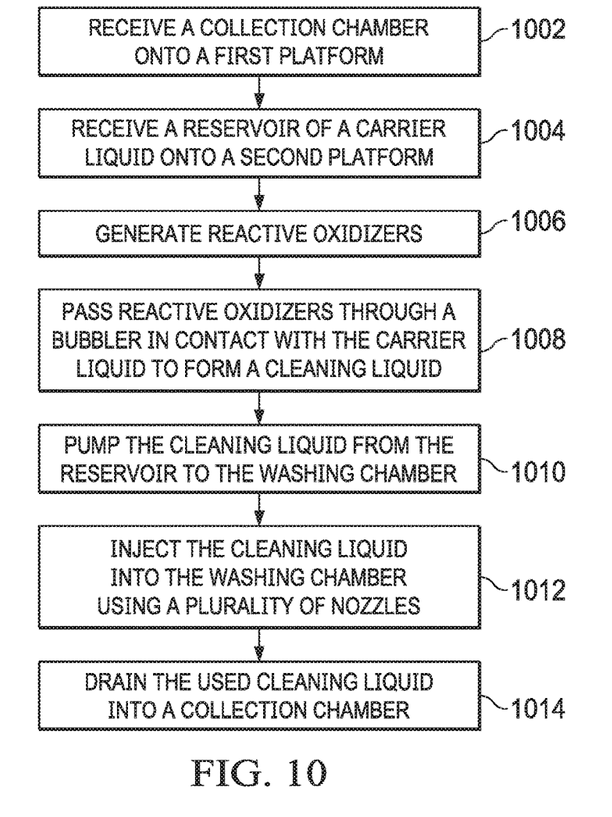
FIG. 10 is a more specific method for cleaning a set of objects using a sanitation apparatus in accordance with an illustrative embodiment.

FIG. 10 is a more specific method for washing a set of objects using a sanitation apparatus in accordance with an illustrative embodiment. A collection chamber is received onto a first platform, the collection chamber housing a washing chamber with a set of objects arranged therein (Step 1002). A reservoir at least partially filled with a carrier liquid is received onto a second platform (Step 1004).

Reactive oxidizers are generated (Step 1006). In one embodiment, the reactive oxidizers are generated in response to receiving a washing cycle selection. In another embodiment the reactive oxidizers are generated in response to closing of a rotatable lid that secures the collection chamber onto the first platform.

The reactive oxidizers are passed through a microbubbler at least partially submerged within the carrier liquid to form a cleaning liquid (Step 1008). The cleaning liquid is then pumped from the reservoir to the washing chamber (Step 1010). Cleaning liquid is injected into the washing chamber through a plurality of nozzles located on the underside of the rotatable lid (Step 1012). In one embodiment, the cleaning liquid is injected into the washing chamber from above the set of objects and from below the set of objects to simultaneously engage the upper surfaces and the lower surfaces of the set of objects. The used cleaning liquid is drained from the washing chamber into the collection chamber (Step 1014).

Figure 11:
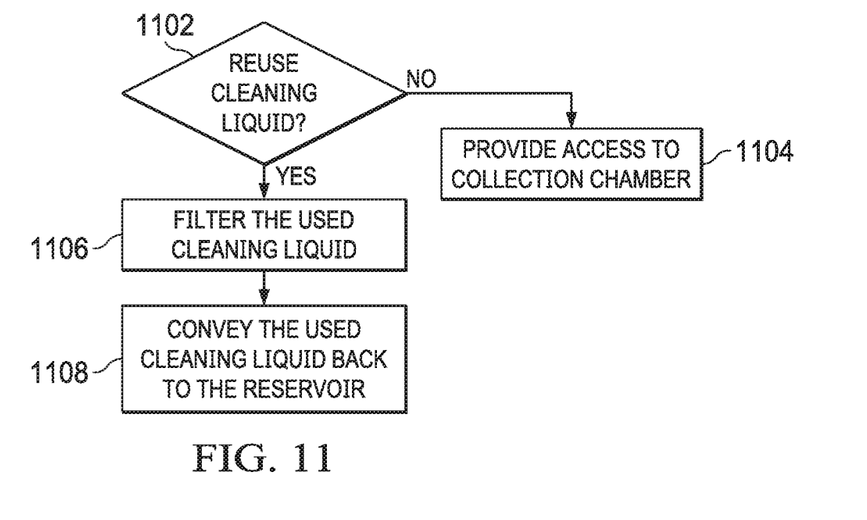
FIG. 11 is a flowchart of a method for handling used cleaning liquid in accordance with an illustrative embodiment.

FIG. 11 is a flowchart of a method for handling used cleaning liquid in accordance with an illustrative embodiment. The method can be implemented in a sanitation apparatus, such as sanitation apparatus 100 in FIGS. 1 and 2. In addition, the method can be implemented after Step 1014 in the flowchart of FIG. 10.

An initial determination is made as to whether the used cleaning liquid will be reused (Step 1102). If the used cleaning liquid will not be reused, then access is provided to the collection chamber (Step 1104). In one embodiment, access is provided to the collection chamber by unlocking a rotatable lid that secures the collection chamber to the first platform. In addition, access may be withheld until after the reactive oxidizers in the cleaning liquid have had sufficient time to decompose back into harmless byproducts.

Returning back to Step 1102, if the used cleaning liquid will be reused, then the used cleaning liquid is filtered (Step 1106) and then returned back to the reservoir (Step 1108).

Figure 12:
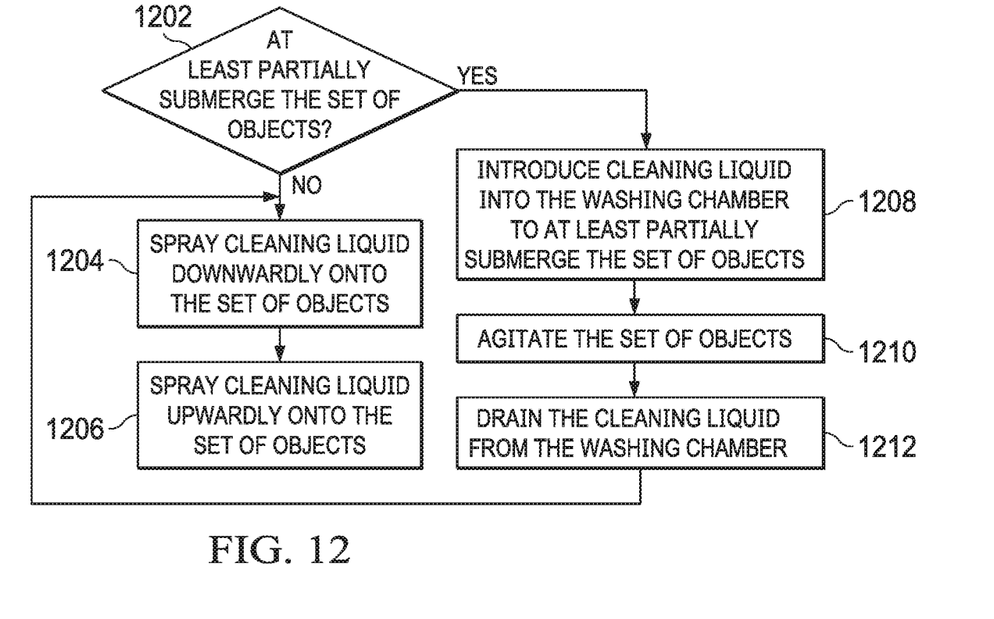
FIG. 12 is a flowchart of a process for injecting cleaning liquid into a washing chamber in accordance with an illustrative embodiment.

FIG. 12 is a flowchart of a process for injecting cleaning liquid into a washing chamber in accordance with an illustrative embodiment. The process can be implemented in Step 910 in FIG. 9 and Step 1012 in FIG. 10.

A first step of the process is to determine whether the set of objects will be at least partially submerged in cleaning liquid (Step 1202). If the set of objects will not be at least partially submerged in the cleaning liquid, then cleaning liquid is sprayed downwardly into the washing chamber (1204). Cleaning liquid is also sprayed upwardly into the washing chamber (1206). In some embodiments, the cleaning liquid is sprayed simultaneously downwardly and upwardly into the washing chamber. Further, in some embodiments the cleaning liquid is sprayed upwardly into the washing chamber by injecting cleaning liquid into a plurality of channels disposed throughout the interior surface of the washing chamber and then redirecting the cleaning liquid with a stream redirection feature.

Returning to Step 1202, if the set of objects will be at least partially submerged within the cleaning liquid, then cleaning liquid is introduced into the washing chamber to at least partially submerge the set of objects (Step 1208). While at least partially submerged in cleaning liquid, the set of objects can be agitated (Step 1210). In a non-limiting embodiment, the set of objects can be agitated in the washing chamber by selectively activating one or more of the nozzles disposed throughout the rotatable lid to impart motion to the volume of cleaning liquid in the washing chamber.

Thereafter, the cleaning liquid is drained from the washing chamber (Step 1212). In one embodiment, the cleaning liquid can be drained into a collection chamber and then the set of objects in the washing chamber can undergo a subsequent rinsing step by returning to Step 1204.

The improved sanitation apparatus and its corresponding methods of use provide a more effective way of washing and disinfecting a set of objects by creating an improved cleaning liquid with reactive oxidizer microbubbles that are resistant to diffusion out of the carrier liquid and into the gaseous phase. The novel sanitation apparatus described herein promotes removal of surface contaminants by effective spraying of cleaning liquid onto the surface of the set of objects from above and below, and can be optionally paired with submersion in a water bath of cleaning liquid. After the reactive oxidizers decompose, the used cleaning liquid reverts back to the carrier liquid and can be easily and safely disposed or reused.

Additional Embodiments

The following descriptive embodiments are offered in further support of the disclosed invention:

In a first embodiment, novel aspects of the present disclosure are directed to an apparatus for washing a set of objects, the apparatus comprising: a washing chamber; and a ROX generator fluidically connected to the washing chamber via a fluid conduit having a distal end that terminates at the washing chamber, wherein the ROX generator is configured to provide reactive oxidizers to a carrier liquid to form a cleaning liquid, wherein the cleaning liquid is transported through the fluid conduit and into the washing chamber.

In another aspect of the first embodiment, apparatus comprises a washing chamber; and a ROX generator fluidically connected to the washing chamber via a fluid conduit having a distal end that terminates at the washing chamber, wherein the ROX generator is configured to provide reactive oxidizers to a carrier liquid to form a cleaning liquid, wherein the cleaning liquid is transported through the fluid conduit and into the washing chamber; and further comprises one or more limitations selected from the following:

wherein the ROX generator is configured to generate ROX cleaning bubbles;

wherein the apparatus further comprises: a microbubbler interfacing between the ROX generator and the carrier liquid, wherein the microbubbler is configured to generate ROX cleaning bubbles from the reactive oxidizers provided by the ROX generator;

wherein the apparatus further comprises: a reservoir having an outlet orifice, wherein the fluid conduit is connected to the outlet orifice;

wherein the apparatus further comprises: a reservoir having an inlet orifice, wherein the inlet orifice is fluidically connected to the ROX generator;

wherein the reservoir further comprises: a set of spring-loaded valves, wherein the set of spring-loaded valves selective seal the outlet orifice and the inlet orifice;

wherein the reservoir is connected to a supplemental source of the carrier liquid;

wherein a proximal end of the fluid conduit is connected to the ROX generator, and wherein the ROX generator is connected to an on-demand source of carrier liquid;

wherein the washing chamber comprises a set of sidewalls extending from an end wall, and wherein the washing chamber further comprises a set of channels each of which is directed towards a stream redirection feature;

wherein the stream redirection feature is a recessed channel coextensive with an outer perimeter of the end wall; and wherein the apparatus further comprises: a collection chamber sized to receive the washing chamber, wherein the washing chamber is configured to be suspended within the collection chamber.

In a second embodiment, novel aspects of the present disclosure are directed to a method for cleaning a set of objects, the method comprising: arranging the set of objects in a washing chamber; charging a carrier liquid with ROX cleaning bubbles to form a cleaning liquid; and introducing the cleaning liquid into the washing chamber to clean a surface of the set of objects.

In another aspect of the second embodiment, novel aspects of the present disclosure are directed to a method for cleaning a set of objects, the method comprising: arranging the set of objects in a washing chamber; charging a carrier liquid with ROX cleaning bubbles to form a cleaning liquid; and introducing the cleaning liquid into the washing chamber to clean a surface of the set of objects, the method further comprising one or more limitations selected from the following:

wherein the introducing step further comprises: spraying the cleaning liquid towards the set of objects from a first direction that includes the gravitational vector;

wherein the introducing step further comprises: spraying the cleaning liquid towards the set of objects from a second direction that includes a directional vector opposite to the gravitational vector;

wherein the method further comprises: draining used cleaning liquid from the washing chamber into a collection chamber during the spraying step;

wherein the introducing step further comprises: at least partially submerging the set of objects in a bath of cleaning liquid; draining the bath of cleaning liquid from the washing chamber; and spraying the cleaning liquid towards the set of objects from a first direction that includes the gravitational vector and a second direction that includes a directional vector opposite to the gravitational vector;

wherein the charging step further comprises: generating reactive oxidizers; and passing the reactive oxidizers through a microbubbler at least partially submerged within the carrier liquid to introduce ROX cleaning bubbles into the carrier liquid to form the cleaning liquid;

wherein the carrier liquid is maintained within a reservoir fluidically connected to the washing chamber by a fluid conduit, and wherein the introducing step further comprises: pumping the cleaning liquid from the reservoir to the washing chamber; and spraying the cleaning liquid into the washing chamber through a set of nozzles;

wherein the carrier liquid is connected to an on-demand source of carrier liquid; and wherein the washing chamber is suspended within a collection chamber, the method further comprising: draining used cleaning liquid from the washing chamber into the collection chamber; filtering the used cleaning liquid; and returning the carrier liquid back to the reservoir.

Although embodiments of the invention have been described with reference to several elements, any element described in the embodiments described herein are exemplary and can be omitted, substituted, added, combined, or rearranged as applicable to form new embodiments. A skilled person, upon reading the present specification, would recognize that such additional embodiments are effectively disclosed herein. For example, where this disclosure describes characteristics, structure, size, shape, arrangement, or composition for an element or process for making or using an element or combination of elements, the characteristics, structure, size, shape, arrangement, or composition can also be incorporated into any other element or combination of elements, or process for making or using an element or combination of elements described herein to provide additional embodiments.

Additionally, where an embodiment is described herein as comprising some element or group of elements, additional embodiments can consist essentially of or consist of the element or group of elements. Also, although the open-ended term "comprises" is generally used herein, additional embodiments can be formed by substituting the terms "consisting essentially of" or "consisting of."

While this invention has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. An apparatus for washing a set of objects, the apparatus comprising:
    a washing chamber formed from a set of sidewalls extending from an end wall and covered by a lid, wherein:
        a set of channels is disposed on the set of sidewalls and extending from the lid towards the end wall, each of the set of channels configured to direct a cleaning liquid from a periphery of the lid to a stream redirection feature at a boundary between the end wall and the set of sidewalls, and
        the stream redirection feature is configured to redirect the cleaning liquid at least partially upwardly into the washing chamber; and
    a reactive oxidizer (ROX) generator fluidically connected to the washing chamber via a fluid conduit having a distal end that terminates at the lid of the washing chamber, wherein:
        the ROX generator is configured to provide reactive oxidizers to a carrier liquid to form the cleaning liquid with ROX cleaning bubbles, and
        the cleaning liquid transported through the fluid conduit is sprayed downwardly into the washing chamber from the lid, and the cleaning liquid sprayed through the set of channels is redirected at least partially upwardly into the washing chamber by the stream redirection feature.

2. The apparatus of claim 1, wherein the ROX generator is configured to generate the ROX cleaning bubbles.

3. The apparatus of claim 1, further comprising:
    a bubbler interfacing between the ROX generator and the carrier liquid, wherein the bubbler is configured to generate the ROX cleaning bubbles from reactive oxidizers provided by the ROX generator.

4. The apparatus of claim 3, wherein the bubbler is a stone bubbler, and wherein the ROX cleaning bubbles are microbubbles.

5. The apparatus of claim 3, wherein the bubbler is a nanobubbler, and wherein the ROX cleaning bubbles are nanobubbles.

6. The apparatus of claim 1, further comprising:
    a reservoir having an outlet orifice, wherein the fluid conduit is connected to the outlet orifice.

7. The apparatus of claim 6, wherein the reservoir comprises an inlet orifice, wherein the inlet orifice is fluidically connected to the ROX generator.

8. The apparatus of claim 7, wherein the reservoir further comprises:
   a set of spring-loaded valves, wherein the set of spring-loaded valves selectively seal the outlet orifice and the inlet orifice.

9. The apparatus of claim 1, wherein a proximal end of the fluid conduit is connected to the ROX generator, and wherein the ROX generator is connected to an on-demand source of carrier liquid.

10. The apparatus of claim 1, wherein the stream redirection feature is a recessed channel coextensive with an outer perimeter of the end wall.

11. The apparatus of claim 1, further comprising:
   a collection chamber sized to receive the washing chamber, wherein the washing chamber is configured to be suspended within the collection chamber.

12. The apparatus of claim 11, wherein the washing chamber is fluidically connected to the collection chamber by a set of apertures disposed within the end wall.

* * * * *